United States Patent [19]

Yukio

[11] Patent Number: 4,720,714
[45] Date of Patent: Jan. 19, 1988

[54] PLOTTER COMPRISING A ROTATABLE PLATEN DISPLACED FROM A SHEET FEEDER

[75] Inventor: Minagawa Yukio, Yamagata, Japan

[73] Assignee: NEC Yonezawa, Ltd., Tokyo, Japan

[21] Appl. No.: 879,847

[22] Filed: Jun. 27, 1986

Related U.S. Application Data

[63] Continuation of Ser. No. 595,270, Mar. 30, 1984, abandoned.

[30] Foreign Application Priority Data

Mar. 31, 1983 [JP] Japan .............................. 58-47671[U]
Mar. 31, 1983 [JP] Japan .............................. 58-47672[U]

[51] Int. Cl.⁴ .............................................. G01D 15/24
[52] U.S. Cl. ..................................... 346/134; 226/193; 226/195; 271/272; 346/129
[58] Field of Search ................... 346/134, 136, 139 R, 346/129; 400/551, 636; 401/209; 226/193, 195; 271/272-274

[56] References Cited

U.S. PATENT DOCUMENTS

| | | | |
|---|---|---|---|
| 2,246,003 | 6/1941 | Rich | 346/134 X |
| 2,690,951 | 10/1954 | Moore | 346/136 |
| 3,084,014 | 4/1963 | Molloy | 346/139 |
| 3,435,459 | 3/1969 | DeNicola | 346/140 X |
| 3,673,604 | 6/1972 | Gordon | 346/141 X |
| 3,761,950 | 9/1973 | Yeiser | 346/134 X |
| 4,000,803 | 1/1977 | Warp | 400/551 X |
| 4,097,874 | 6/1978 | Anderka | 346/141 X |
| 4,318,113 | 3/1982 | Skafvenstedt | 346/136 |
| 4,329,262 | 5/1982 | Muller | 401/209 X |
| 4,384,298 | 5/1983 | LaBarre | 346/134 |
| 4,405,931 | 9/1983 | Fujisawa | 346/139 |
| 4,527,174 | 7/1985 | Fujisawa | 346/136 |

OTHER PUBLICATIONS

Williams, Tom; Micro-Grip Drive Keeps Plotter Moving Accurately, Electronic Design, Jan. 8, 1981, pp. 44, 46.

Primary Examiner—Joseph W. Hartary
Attorney, Agent, or Firm—Hopgood, Calimafde, Kalil, Blaustein & Judlowe

[57] ABSTRACT

In a printer having a pen movable in an X-direction, a platen, and a sheet feeder for feeding a recording sheet in a Y-direction and displaced from the platen in the Y-direction, the platen comprises a platen roller rotatable around a center axis thereof. A pen is opposite to the platen with the recording sheet interposed therebetween and is brought into contact with the recording sheet to press the recording sheet against the platen roller, each time when recording is carried out. The platen roller is rotated by frictional force which occurs between the recording sheet and the platen roller. The platen roller may forcibly be rotated in the same direction as a driving roller included in the sheet feeder. Preferably, the driving roller has a knurling portion along an outer peripheral surface.

13 Claims, 7 Drawing Figures

PLOTTER COMPRISING A ROTATABLE PLATEN DISPLACED FROM A SHEET FEEDER

This application continuation of application Ser. No. 595,270, filed 3/30/84.

BACKGROUND OF THE INVENTION:

This invention relates to a printer which will be called an X-Y plotter hereinafter.

A conventional X-Y plotter disclosed by J. O. Yeiser in U.S. Pat. No. 3,761,950 prints or gives a mark, such as a letter, a symbol, a sign, or a figure, on a recording sheet by at least one writing element, such as a pen and the like. More particularly, the plotter comprises a pen carriage for carrying the pen in a first predetermined direction, namely, an X-direction, and a sheet feeder for feeding the recording sheet in a second predetermined direction, namely, a Y-direction orthogonal to the X-direction. The sheet feeder is displaced from the pen carriage in the Y-direction. A flat platen plate which is referred to as a machine table is fixedly laid under the pen and extended towards the sheet feeder. The pen and the recording sheet can be moved in the first and the second directions, respectively.

Before recording, the recording sheet is extended from the sheet feeder on the flat platen so as to place the recording sheet under the writing element. The pen is brought into contact with the recording sheet each time when a mark is recorded on the recording sheet by the pen. Since the pen carriage is displaced from the sheet feeder in the Y-direction, as mentioned before, the pen is widely movable along the first predetermined direction without being brought into contact with the sheet feeder. In other words, it is possible to effectively utilize the recording sheet along the X-direction. However, frictional force between the recording sheet and the platen plate is very large when the recording sheet is urged to the platen plate by the writing element. The frictional force prevents the recording sheet from being favorably and smoothly fed in the Y-direction. As a result, this plotter is incapable of giving each mark at a high precision on the recording sheet.

SUMMARY OF THE INVENTION

It is therefore an object of the present invention to provide a plotter which is capable of widely moving a writing element on a recording sheet in an X-direction.

It is another object of this invention to provide a plotter of the type described, wherein a recording sheet is favorably and smoothly fed in a Y-direction.

It is still another object of this invention to provide a plotter of the type described, wherein a decrease of frictional force is possible between the recording sheet and a platen member.

According to this invention, there is provided a plotter for use in recording a mark on a recording sheet by a marking member during movement of the recording sheet and the marking member, the plotter comprising a guide member extended from a first predetermined position along a first predetermined direction for guiding the movement of the marking member, first driving means for driving the marking member in the first predetermined direction, a platen member having a center axis along the first predetermined direction and a cylindrical body extended along the center axis with a peripheral surface defined thereon, the cylindrical body being opposite to the marking member and rotatable around the center axis, sheet feeding means for feeding the recording sheet in a second predetermined direction orthogonal to the first predetermined direction, the sheet feeding means being placed at a second predetermined position which is displaced from the first predetermined position in the second predetermined direction with a spacing left between the first and second predetermined positions, and second driving means for driving the sheet feeding means.

DESCRIPTION OF THE PREFERRED EMBODIMENTS

Figure 1:
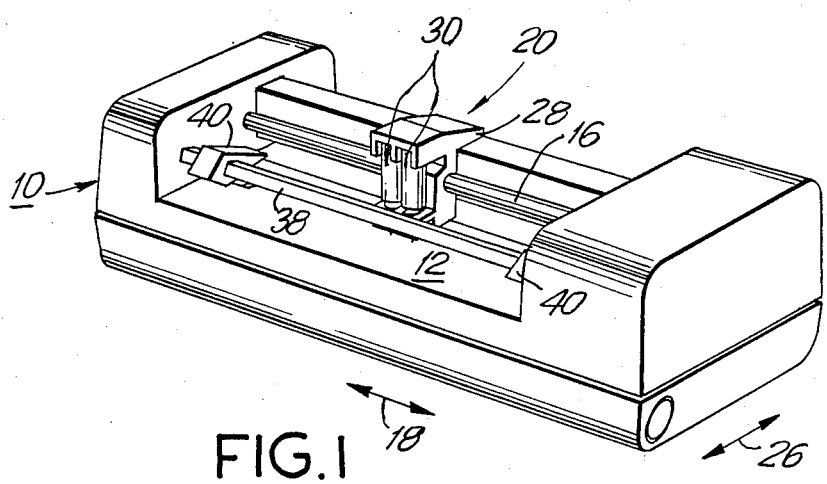
FIG. 1 is a perspective view of a plotter according to one embodiment of the instant invention.
Figure 2:
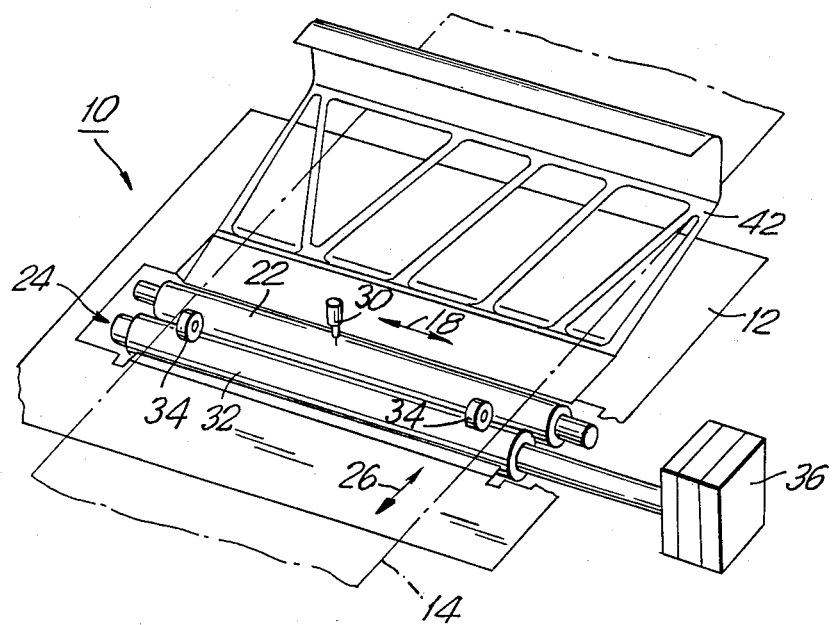
FIG. 2 is a fragmentary schematic perspective view for use in describing operation of the plotter illustrated in FIG. 1.

Referring to FIGS. 1 and 2, a plotter according to an embodiment of the present invention comprises a machine frame or body 10 defining a generally flat top surface 12 at a center area thereof. A recording sheet 14, such as a paper, is laid along the top surface 12, as shown in FIG. 2. A guide bar 16 is extended in a first predetermined direction, namely, X-direction 18. The guide bar 16 is fixed to the body 10 on both sides of the center area of the body 10. A marking member 20 is guided by the guide bar 16 above the recording sheet 14 and movable along the guide bar 16. A platen roller 22 is extended in the X-direction 18 under the marking member 20 and is rotatable around a center axis thereof. A sheet feeder 24 is placed in the vicinity of the platen roller 22 and is displaced from the platen roller 22 in a second predetermined direction, namely, Y-direction 26 orthogonal to the X-direction 18.

More specifically, the marking member 20 includes a carriage 28 slidably supported on the guide bar 16 and a plurality of marking elements 30 removably mounted to the carriage 28. The carriage 28 can be moved by driving means (not shown) so as to convey the marking elements 30 in the X-direction 18. Each of the marking elements 30 may be a ball-point pen or a marking pen which has a pen point directed towards a peripheral surface of the platen roller 22. The platen roller 22 has a pair of platen ends rotatably held by the body 10. Preferably, the platen roller 22 comprises a core of an aluminum and a sheath of a rubber material covered on the core.

The sheet feeder 24 includes a driving roller 32 extended in the X-direction 18 at a position which is displaced from and adjacent to the platen roller 22 in the Y-direction 26 and two pinch rollers 34 arranged with a spacing left between them in the X-direction 18. The driving roller 32 is rotatably supported by the body 10 and driven by a motor 36. The pinch rollers 34 are opposite to and laid over the driving roller 32 and movable between an upper position and a lower position nearer to the driving roller 32 than the upper position. Anyway, the recording sheet 14 is interposed between the driving roller 32 and the pinch rollers 34 and fed in the Y-direction by rotation of the driving roller 32. In order to move the pinch rollers 34 between the upper and the lower positions, the illustrated plotter comprises a supporting bar 38 (FIG. 1) extended in the X-direction 18 and supported by the body 10 on both bar ends thereof and two arms 40 attached to the supporting bar 38. The pinch rollers 34 are rotatably supported by the arms 40, respectively, and urged towards the driving roller 32 by a suitable spring means (not shown). Moreover, at least one of the arms 40 is movable along the supporting bar 38. Therefore, the spacing between the pinch rollers 34 is adjustable so as to be matched with a width of the recording sheet 14 even when the width of the recording sheet 14 is changed.

Before recording, the pinch rollers 34 are lifted up to the upper position and then the recording sheet 14 is interposed between the driving roller 32 and each of the pinch rollers 34. Under the circumstances, the pinch rollers 34 are lowered to the lower position to pinch the recording sheet 14 between the driving roller 32 and the pinch rollers 34. Thus, the recording sheet 14 which is pinched by the driving roller 32 and the pinch rollers 34 are movable along the top surface 12 of the body 10 in the Y-direction 26 by rotation of the driving roller 32. For preventing a curl of the recording sheet 14, a curing plate 42 is partially placed over the top surface 12 at the rear of the platen roller 22 with a gap left between the top surface 12 and the curing plate 12. As a result, the recording sheet 14 is led into the gap.

On recording, the writing elements 30 and the recording sheet 14 are moved in the X-direction and the Y-direction under control of a control circuit (not shown), respectively. Each writing element 30 is brought into contact with the recording sheet 14 each time when recording is carried out. Therefore, the recording sheet 14 can be given a mark, such as a letter, a symbol, a sign, or a figure, during movement of the writing element 30 and the recording sheet 14.

Figure 3:
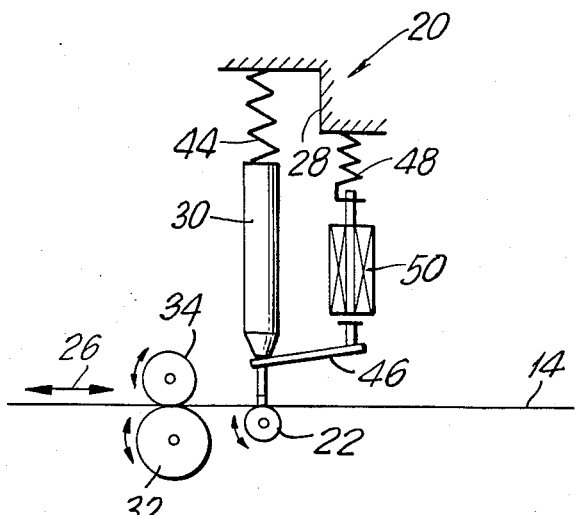
FIG. 3 is a schematic side view of a portion of the plotter illustrated in FIGS. 1 and 2.

Referring to FIG. 3, the marking member 20 further includes a pair of pen drive mechanisms for driving the writing elements 30, respectively, although a single pen drive mechanism alone is illustrated in FIG. 3. Each of the pen drive mechanisms comprises a first spring 44 for pressing the writing element 30 against the recording sheet 14, and a lever 46 having a pair of lever ends. One of the lever ends is coupled to the writing element 30 in the proximity of the pen point of the writing element 30. The other end of the lever 46 is coupled through a second spring 48 to an electrical solenoid 50. The second spring 48 serves to lift up the writing element 30 in cooperation with the electrical solenoid 50. In the illustrated state, the second spring 48 is compressed by energizing the electrical solenoid 50 in a known manner. As a result, the writing element 30 is urged downwards by the first spring 44 to be brought into press contact with the recording sheet 14. Thus, the recording sheet 14 is pressed against the peripheral surface of the platen roller 22. Frictional force occurs between the recording sheet 14 and the platen roller 22 on pressing the recording sheet 14 against the platen roller 22.

Under the circumstances, when the recording sheet 14 is moved in the Y-direction 26 by the driving and pinch rollers 32 and 34, the platen roller 22 is turned by the frictional force. The frictional force is remarkably reduced in comparison with the case where a platen is fixed as the conventional plotter disclosed in the above-referenced United States Patent. Therefore, the recording sheet 14 is favorably and smoothly moved in the Y-direction 26 without substantial slippage of the platen roller 22. As a result, the illustrated plotter is capable of giving each mark at a high precision on the recording sheet 14 by the writing elements 30. Moreover, since the writing element 30 may be strongly pressed to the recording sheet 14, it is possible to use a ball-point pen of oil soluble ink.

When the solenoid 50 is deenergized, the marking element 30 is lifted up via the lever 46 by restoration of the second spring 48. Simultaneously, the first spring 44 is compressed.

Figure 4:
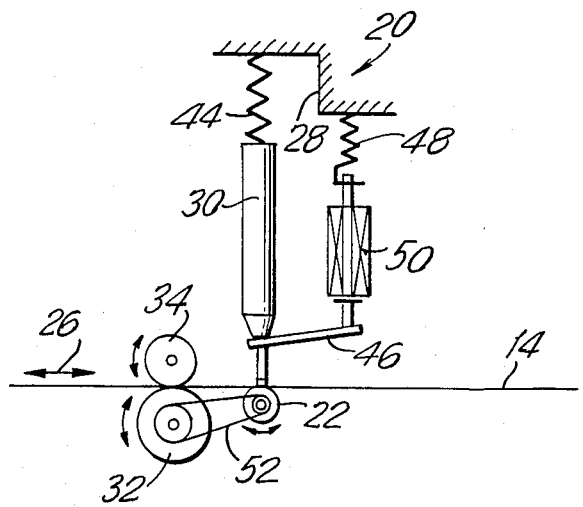
FIG. 4 is a similar view of a plotter according to another embodiment of this invention.

Referring to FIG. 4, a plotter according to another embodiment of the invention is similar to that illustrated in FIG. 3 except that the illustrated plotter further comprises a transmission mechanism 52 for transmitting a rotation of the driving roller 32 to the platen roller 22. The transmission mechanism 52 may be, for example, a belt transmission. In this embodiment shown in FIG. 4, the platen roller 22 rotates in the same direction as the driving roller 32. Preferably, the mechanism is adjusted so that the platen roller 22 feeds the recording sheet 14 at the same rate as the driving roller 32.

Figure 5:
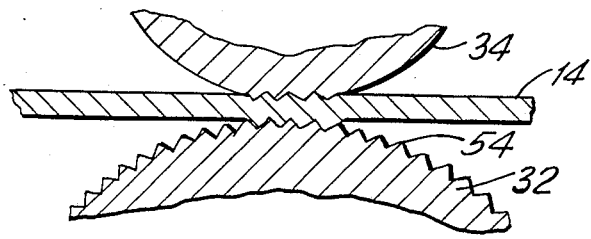
FIG. 5 is a fragmentary enlarged sectional view of a part of a sheet feeder used in the plotter illustrated in FIGS. 1 and 2.
Figure 6:
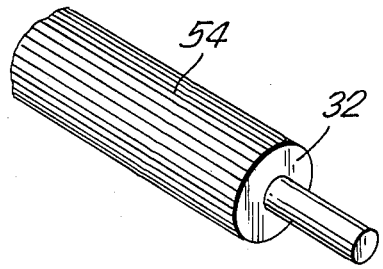
FIG. 6 is a partial perspective view of a driving roller used in the feeder illustrated in FIG. 5.

Referring to FIGS. 5 and 6, a driving roller 32 is applicable to that illustrated in FIGS. 1 through 4. The illustrated driving roller 32 has a knurling portion along an outer peripheral surface. Such a knurling portion may be of alumina. The remaining portion except the knurling portion may be of an aluminum alloy. The knurling portion comprises a number of knurles 54 each of which extends parallel to an axis of the driving roller 32 to form parallel stripes, as shown in FIG. 6.

Figure 7:
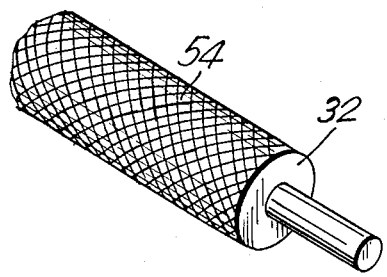
FIG. 7 is a similar view of a modified driving roller.

Referring to FIG. 7, the knurles 54 may be helically formed on the peripheral surface of the driving roller 32. Such helical knurls appear like an aggregation of diamonds or rhombi in the side view of the driving roller 32 because the helical knurls are crossed on the peripheral surface.

Turning back to FIG. 5, the roller 34 has a peripheral portion of rubber. According to this construction, when the recording sheet 14 is pinched between the driving roller 32 and the pinch rollers 34, the recording sheet 14 is firmly gripped by each of the knurles 54 of the driving roller 32 in cooperation with the pinch rollers 34, as shown in FIG. 5. Therefore, the driving roller 32 is firmly engaged with the recording sheet 14 so as to favorably feed the recording sheet 14 at a high precision. Hereupon, the knurles 54 on the peripheral surface of the driving roller 32 are preferably formed at a pitch between 0.4–0.8 mm.

After a predetermined recording is finished, the recording sheet 14 is sent between the top surface 12 and the curing plate 42. At this time, the curling of the recording sheet 14 is cured or removed by the curing plate 42.

Although two writing elements 30 alone are shown in FIG. 1, it will be redily understood that either more than two writing elements or a single writing element may be included in the marking member.

What is claimed is:

1. A plotter for use in recording a mark on a recording sheet by a marking member during movement of said recording sheet and said marking member, said plotter comprising:

a guide member extending along a first predetermined direction for guiding said movement of said marking member;
first driving means for driving said marking member in said first predetermined direction;
a platen member located at a first predetermined position and having a center axis along said first predetermined direction and a cylindrical body extending along said center axis with a peripheral surface defined thereon, said cylindrical body being disposed opposite to said marking member and rotatable around said center axis;
single sheet feeding means for feeding said recording sheet forwards and backwards in a second predetermined direction orthogonal to said first predetermined direction, said sheet feeding means being disposed only at a second predetermined position which is displaced from said first predetermined position on one side of said platen member in said second predetermined direction with a spacing disposed between said platen member and said sheet feeding means; and
second driving means for driving said sheet feeding means;
said sheet feeding means including: a driving roller extended in parallel with said center axis, said driving roller being rotated by said second driving means; and a pinch roller opposite to said driving roller, said recording sheet being pinched between said driving roller and said pinch roller;
both of said driving and said pinch rollers being adjacent to said cylindrical body so that said recording sheet is not deformed between said cylindrical body and said driving and said pinch rollers when said recording is fed forwards and backwards by said driving roller.

2. A plotter as claimed in claim 1, wherein said marking member includes a carriage supported on said guide member and slidable along said first predetermined direction, a writing element conveyed by said carriage for recording the mark on said recording sheet, a spring for pressing said writing element against said recording sheet, and third driving means for moving said writing element towards a position in which said writing element is distant from said recording sheet.

3. A plotter as claimed in claim 2, wherein said marking member further comprises an additional writing element conveyed by said carriage for recording an additional mark on said recording sheet and means for driving said additional writing element against said recording sheet.

4. A plotter as claimed in claim 1, wherein said platen member comprises a core of a metal material, and sheath of a rubber material covered on said core.

5. A plotter as claimed in claim 4, wherein said platen member is rotatable around said center axis independently of said sheet feeding means so as to be rotated by the frictional force which occurs between said recording sheet and said rubber material.

6. A plotter as claimed in claim 1, wherein said writing element is a ball-point pen which is brought into press contact with said recording sheet.

7. A plotter as claimed in claim 6, wherein said ball-point pen is of oil soluble ink.

8. A plotter as claimed in claim 1, wherein said plotter further comprises transmission means for transmitting the rotation of said driving roller to said platen member so that said platen member feeds said recording sheet at the same rate as said driving roller.

9. A plotter as claimed in claim 1, wherein the peripheral surface of said driving roller is made of metal and has knurling, said pinch roller having a peripheral portion made of a rubber.

10. A plotter as claimed in claim 1, said second predetermined position being disposed on one side of said first predetermined direction, wherein said plotter further comprises an additional guide member opposite to said recording sheet for guiding movement of said recording sheet, said additional guide member being located at a third predetermined position which is disposed on the other side of said first predetermined position in said second predetermined direction 11. A plotter as claimed in claim 10, wherein said additional guide member includes a curl curing element extending along a third predetermined direction which intersects both of said first and said second predetermined directions, said curl curing element being brought into contact with said recording sheet for preventing curl of said recording sheet.

12. A plotter as claimed in claim 1, wherein said sheet feeding means further comprises an additional pinch roller displaced from the first-mentioned pinch roller in said first predetermined direction, said additional pinch roller being adjacent to the peripheral surface of said cylindrical body and opposite to the peripheral surface of said driving roller, said recording sheet being pinched between said driving roller and said additional pinch roller.

13. A plotter for use in recording a mark on a recording sheet by a marking member during movement of said recording sheet and said marking member, said plotter comprising:
a guide member extending along a first predetermined direction for guiding said movement of said marking member;
first driving means for driving said marking member in said first predetermined direction;
a platen member located at a first predetermined position and having a central axis along said first predetermined direction and a cylindrical body extending along said center axis with a peripheral surface defined thereon, said cylindrical body being disposed opposite to said marking member and rotatable around said central axis;
sheet feeding means for feeding said recording sheet forwards and backwards in a second predetermined direction orthogonal to said first predetermined direction, said sheet feeding means being disposed only at a second predetermined position which is displaced from said first predetermined position on one side of said platen member in said second predetermined direction with a first spacing disposed between said platen member and said sheet feeding means;
second driving means for driving said sheet feeding means; and
said sheet feeding means including a driving roller adjacent to the peripheral surface of said cylindrical body and extended along said first predetermined direction, and a plurality of pinch rollers arranged with a second spacing disposed therebetween in said first predetermined direction, each of said pinch rollers being adjacent to the peripheral surface of said cylindircal body and opposed to a peripheral surface of said driving roller, the peripheral surface of said driving roller being of metallic material and having knurling, each of said pinch rollers having an elastomeric peripheral portion, said recording sheet being pinched between said driving roller and each of said pinch rollers.

* * * * *